United States Patent
Adimoolam et al.

(10) Patent No.: US 12,196,850 B2
(45) Date of Patent: Jan. 14, 2025

(54) METHOD AND SYSTEM TO TRACK AND MONITOR HUMAN USING AN ARRAY OF RADARS

(71) Applicant: Tata Consultancy Services Limited, Mumbai (IN)

(72) Inventors: Satheesh Adimoolam, Bangalore (IN); Tapas Chakravarty, Kolkata (IN); Arindam Ray, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 338 days.

(21) Appl. No.: 17/817,027

(22) Filed: Aug. 3, 2022

(65) Prior Publication Data
US 2023/0073570 A1 Mar. 9, 2023

(30) Foreign Application Priority Data
Aug. 10, 2021 (IN) ............... 202121036166

(51) Int. Cl.
 *G01S 13/89* (2006.01)
 *G01S 13/72* (2006.01)
(52) U.S. Cl.
 CPC .............. *G01S 13/89* (2013.01); *G01S 13/72* (2013.01)
(58) Field of Classification Search
 CPC ........ G01S 13/72; G01S 13/726; G01S 13/89; G08B 21/043; G08B 21/0469
 See application file for complete search history.

(56) References Cited

U.S. PATENT DOCUMENTS

| | | | | |
|---|---|---|---|---|
| 6,225,906 | B1 * | 5/2001 | Shore | G08B 25/14 340/10.5 |
| 7,567,200 | B1 * | 7/2009 | Osterweil | G01S 13/56 342/28 |

(Continued)

OTHER PUBLICATIONS

Matti Hämäläinen et al., "Ultra-Wideband Radar-Based Indoor Activity Monitoring for Elderly Care," Sensors, 2020, vol. 21(9), Publisher: MDPI, https://www.mdpi.com/1424-8220/21/9/3158.

(Continued)

*Primary Examiner* — Peter M Bythrow
(74) *Attorney, Agent, or Firm* — Finnegan, Henderson, Farabow, Garrett & Dunner, LLP

(57) ABSTRACT

This disclosure relates generally to method and system to track and monitor human using an array of radars. Human tracking is necessarily important in security, especially with the growth of threats and incidents. Conventional systems and method lack in tracking target subject being authenticated to move around the monitoring environment. The present invention provides a method of detect human continually based on radar signals from an array of radars to track the presence of one or more target subjects associated within the monitoring environment. Further, a height surface plot of each target subject present in a radar range is constructed for identification. Then, each target subject present in the radar range of the monitoring environment based on mapping the height surface plot with a predefined height map. The characteristics of each target subject helps in detecting the target subject accurately.

20 Claims, 11 Drawing Sheets

(56) References Cited

U.S. PATENT DOCUMENTS

| | | | | |
|---|---|---|---|---|
| 7,893,844 | B2* | 2/2011 | Gottlieb | G08B 21/0446 340/539.12 |
| 7,916,066 | B1* | 3/2011 | Osterweil | A61B 5/1117 382/115 |
| 8,068,051 | B1* | 11/2011 | Osterweil | G01S 7/006 340/573.5 |
| 8,704,702 | B2* | 4/2014 | van Dorp | G01S 13/87 342/126 |
| 10,314,489 | B2* | 6/2019 | Chang | A61B 5/14532 |
| 10,629,049 | B2* | 4/2020 | Hassey | G08B 21/0446 |
| 11,516,625 | B2* | 11/2022 | Lagace | G01S 13/46 |
| 2012/0001787 | A1* | 1/2012 | van Dorp | G01S 13/46 342/28 |
| 2013/0201316 | A1* | 8/2013 | Binder | G07C 3/02 701/2 |
| 2018/0160943 | A1* | 6/2018 | Fyfe | A61B 5/1112 |
| 2019/0158340 | A1* | 5/2019 | Zhang | H04B 17/318 |
| 2020/0166611 | A1* | 5/2020 | Lin | G01S 13/0209 |
| 2020/0406860 | A1* | 12/2020 | Mai | B60R 25/31 |
| 2021/0052221 | A1* | 2/2021 | Panneer Selvam | A61B 5/1117 |
| 2021/0150872 | A1* | 5/2021 | Ten Kate | G08B 29/188 |
| 2021/0321953 | A1* | 10/2021 | Panneer Selvam | A61B 5/681 |
| 2022/0392325 | A1* | 12/2022 | Chen | G08B 21/043 |
| 2023/0000396 | A1* | 1/2023 | Coffey | A61B 5/1117 |
| 2023/0200649 | A1* | 6/2023 | Toth | G16H 40/67 705/2 |

OTHER PUBLICATIONS

Peijun Zhao et al, "mID: Tracking and Identifying People with Millimeter Wave Radar," International Conference on Distributed Computing in Sensor Systems (DCOSS), 2019, IEEE, http://www.cs.ox.ac.uk/files/10889/%5BDCOSS19%5DmID.pdf.

* cited by examiner

Person 1

Person 2

METHOD AND SYSTEM TO TRACK AND MONITOR HUMAN USING AN ARRAY OF RADARS

CROSS-REFERENCE TO RELATED APPLICATIONS AND PRIORITY

This U.S. Patent application claims priority under 35 U.S.C§ 119 to: Indian patent Application no. 202121036166, filed on Aug. 10, 2021. The entire contents of the aforementioned application are incorporated herein by reference.

TECHNICAL FIELD

The disclosure herein generally relates to monitoring environment, and, more particularly, to method and system to track and monitor human using an array of radars.

BACKGROUND

Human detection and tracking have become key necessities in security, especially with the growth of threats and incidents worldwide. The ability to continuously monitor human motion is important in numerous functions such as surveillance, application control, and analysis. In general, tracking refers to the position of target users in a space. Before, tracking process starts the radar detects targets and find their range, position, and angular velocity. Conventionally, point object tracking is complicated by multiple point objects leaving and entering the vicinity of the radar system due to movement of the radar system and/or movement of the point objects. The demand for the use of radar in indoor environment is increasing using vision sensors images that are widely used to detect and monitor human environment. However, these camera-based human recognition methods are vulnerable in terms of privacy protection that acquire images of each target being monitored. Such conventional methods lack in tracking targets that are being authorized to move around from one radar range to another radar range surveillance in the monitoring environment.

SUMMARY

Embodiments of the present disclosure present technological improvements as solutions to one or more of the above-mentioned technical problems recognized by the inventors in conventional systems. For example, in one embodiment, a method for track and monitor human using an array of radars is provided. The system includes to receive, a radar signal from an array of radars configured to a monitoring environment, wherein the radar signal continually tracks the presence of one or more target subjects associated within the monitoring environment. Further, each target subject present in the monitoring environment is authenticated based on comparing a device ID associated with each target subject with a list of preregistered subjects device IDs. Then, a height surface plot is constructed for each target subject present in a radar range for identification based on (i) the authenticated device ID of each target subject, and a 3D cloud point of the radar signal exhibiting the monitoring environment. Further, each target subject present in the radar range of the monitoring environment is recognized based on mapping the height surface plot with a predefined height map associated with the data source. Further, each target subject present in the radar range are tracked based on a closest mapped height surface plot and the device ID of each target subject.

In one embodiment, the height surface plot of each target subject present in the radar range is constructed by, plotting, the 3D point cloud comprising three co-ordinates (X,Y,Z) with the surface height of each target subject present within the radar range obtained from the radar signal, wherein the surface height of each target subject is computed using the Z coordinate. Then, a plurality of grids is formed for the 3D point cloud to obtain a field of view (FOV) of the moving target subject within its present radar range in the monitoring environment. Further, outliers detected are removed from the plurality of grids based on a threshold computed using a mean and a standard deviation, wherein the outliers are detected from each grid using a distance based k nearest neighbor outlier detection technique. Further, the missing spots are filled in the FOV to smoothen height surface plots at a predefined granularity to construct the height surface plot to perform interpolation.

In another aspect, a method for track and monitor human using an array of radars is provided. The method includes receive, a radar signal from an array of radars configured to a monitoring environment, wherein the radar signal continually tracks the presence of one or more target subjects associated within the monitoring environment. Further, each target subject present in the monitoring environment is authenticated based on comparing a device ID associated with each target subject with a list of preregistered subjects device IDs. Then, a height surface plot is constructed for each target subject present in a radar range for identification based on (i) the authenticated device ID of each target subject, and a 3D cloud point of the radar signal exhibiting the monitoring environment. Further, each target subject present in the radar range of the monitoring environment is recognized based on mapping the height surface plot with a predefined height map associated with the data source. Further, each target subject present in the radar range are tracked based on a closest mapped height surface plot and the device ID of each target subject.

In one embodiment, the height surface plot of each target subject present in the radar range is constructed by, plotting, the 3D point cloud comprising three co-ordinates (X,Y,Z) with the surface height of each target subject present within the radar range obtained from the radar signal, wherein the surface height of each target subject is computed using the Z coordinate. Then, a plurality of grids is formed for the 3D point cloud to obtain a field of view (FOV) of the moving target subject within its present radar range in the monitoring environment. Further, outliers detected are removed from the plurality of grids based on a threshold computed using a mean and a standard deviation, wherein the outliers are detected from each grid using a distance based k nearest neighbor outlier detection technique. Further, the missing spots are filled in the FOV to smoothen height surface plots at a predefined granularity to construct the height surface plot to perform interpolation.

In yet another aspect, a non-transitory computer readable medium provides one or more non-transitory machine-readable information storage mediums comprising one or more instructions, which when executed by one or more hardware processors perform actions includes an I/O interface and a memory coupled to the processor is capable of executing programmed instructions stored in the processor in the memory to receive, a radar signal from an array of radars configured to a monitoring environment, wherein the radar signal continually tracks the presence of one or more target subjects associated within the monitoring environment. Further, each target subject present in the monitoring environment is authenticated based on comparing a device ID associated with each target subject with a list of preregistered subjects device IDs. Then, a height surface plot is constructed for each target subject present in a radar range for identification based on (i) the authenticated device ID of each target subject, and a 3D cloud point of the radar signal exhibiting the monitoring environment. Further, each target subject present in the radar range of the monitoring environment is recognized based on mapping the height surface plot with a predefined height map associated with the data source. Further, each target subject present in the radar range are tracked based on a closest mapped height surface plot and the device ID of each target subject.

In one embodiment, the height surface plot of each target subject present in the radar range is constructed by, plotting, the 3D point cloud comprising three co-ordinates (X,Y,Z) with the surface height of each target subject present within the radar range obtained from the radar signal, wherein the surface height of each target subject is computed using the Z coordinate. Then, a plurality of grids is formed for the 3D point cloud to obtain a field of view (FOV) of the moving target subject within its present radar range in the monitoring environment. Further, outliers detected are removed from the plurality of grids based on a threshold computed using a mean and a standard deviation, wherein the outliers are detected from each grid using a distance based k nearest neighbor outlier detection technique. Further, the missing spots are filled in the FOV to smoothen height surface plots at a predefined granularity to construct the height surface plot to perform interpolation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
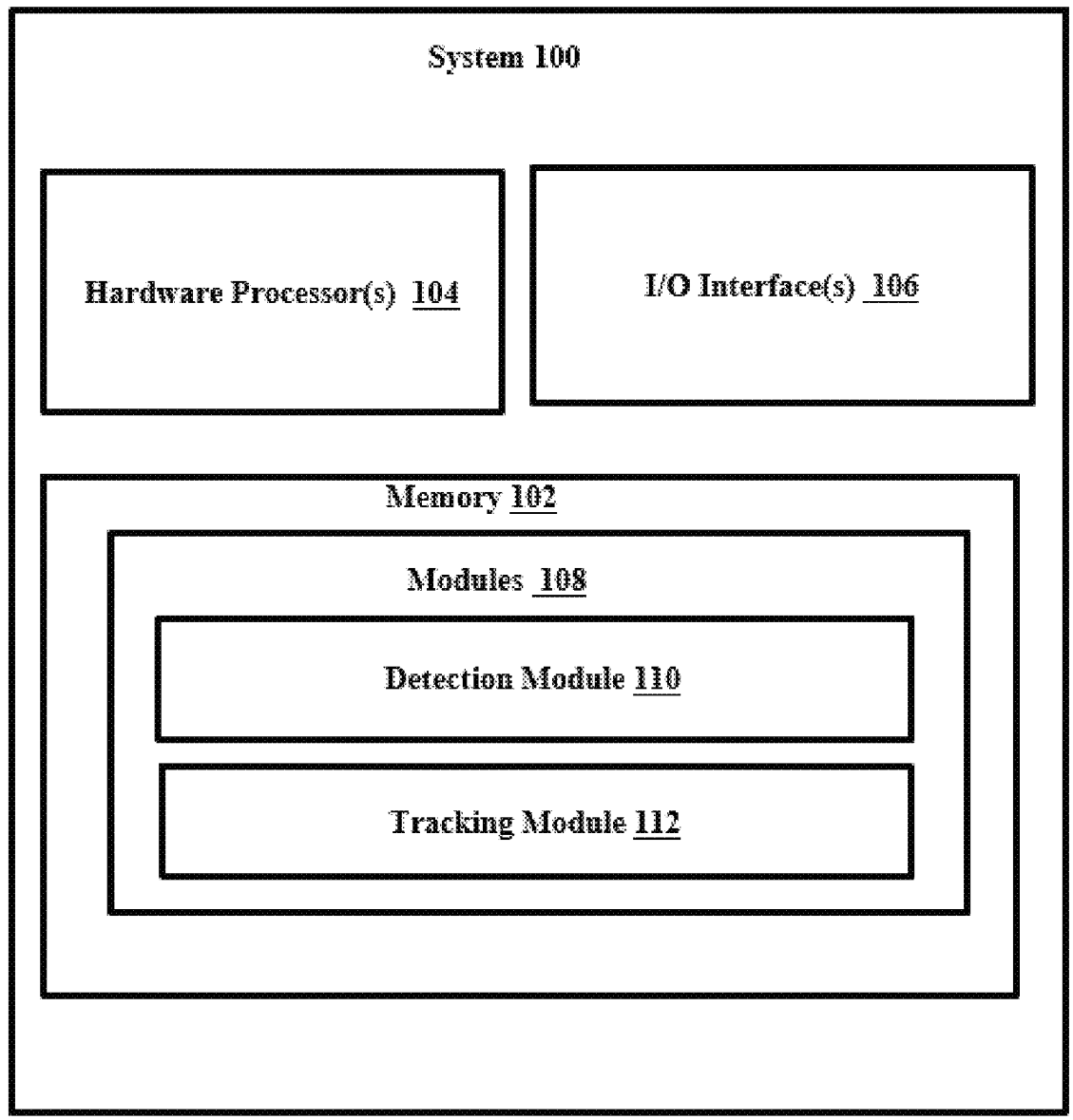
FIG. 1 illustrates an exemplary block diagram of a system (alternatively referred as human monitoring system), in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provide a method and system to track and monitor human using an array of radars. The system may be alternatively referred as human monitoring system, which enables tracking of target subject being monitored by each radar from an array of radar sensors configured in a monitoring environment. Examples of the monitoring environment includes surveillance of industries, buildings, units and thereof which are deployed with the array of radars. An agile workspace in the post covid scenario is likely to have open boundaries that includes for example, no cubicles, designated workspaces maintaining social distancing, and the like. At times the requirement of dynamically optimizing the space utilization in terms of number of people using the facilities is addressed within scalable time. In an enterprise scenario, with multiple designated workspaces, it is envisaged that all the authorized personnel can utilize any one vacant space in any of the rooms. The present disclosure detects and tracks each target subject present in the defined area of the monitoring environment using a low cost, non-camera-based approach which enables privacy protection. The characteristics of each target subject helps in detecting the target subject accurately using the array of radars in wall and mounted at ceiling efficiently. The radar signal obtained from each radar tracks the presence of target subject within the radar range of the monitoring environment. However, the disclosed system provides tracking target subject with an agnostic approach as described in conjunction with FIG. 1 through FIG. 5F below.

Referring now to the drawings, and more particularly to FIG. 1 through FIG. 5F, where similar reference characters denote corresponding features consistently throughout the figures, there are shown preferred embodiments and these embodiments are described in the context of the following exemplary system and/or method.

FIG. 1 illustrates an exemplary block diagram of a system (alternatively referred as human monitoring system), in accordance with some embodiments of the present disclosure. In an embodiment, the human monitoring system 100 includes processor(s) 104, communication interface(s), alternatively referred as or input/output (I/O) interface(s) 106, and one or more data storage devices or memory 102 operatively coupled to the processor(s) 104. The system 100, with the processor(s) is configured to execute functions of one or more functional blocks of the system 100. Referring to the components of the system 100, in an embodiment, the processor(s) 104 can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server. The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

The memory 102 comprises a plurality of modules 108 that can be an Integrated Circuit (IC) (not shown), external to the memory 102, implemented using a Field-Programmable Gate Array (FPGA) or an Application-Specific Integrated Circuit (ASIC). The names (or expressions or terms) of the modules of functional block within the modules 108 referred herein, are used for explanation and are not construed to be limitation(s). The modules 108 includes a detection module 110, and a tracking module 112. The detection module 110 detects the motion data of the target subject present in the monitoring of motion data as inputs received from each radar sensor configured within the radar range of the monitoring environment. The present disclosure is further explained considering an example, where the system 100 receives the radar signal from the radar sensor of the array of radars for tracking the target subject using the system of FIG. 1. Further, the memory 102 may comprises information pertaining to input(s)/output(s) of each step performed by the processor(s) 104 of the system 100 and methods of the present disclosure. Functions of the components of system 100, to detect and track the target subject in the monitoring environment, are explained in conjunction with FIG. 2 through FIG. 5F providing flow diagram, architectural overviews, and performance analysis of the system 100.

Figure 2:
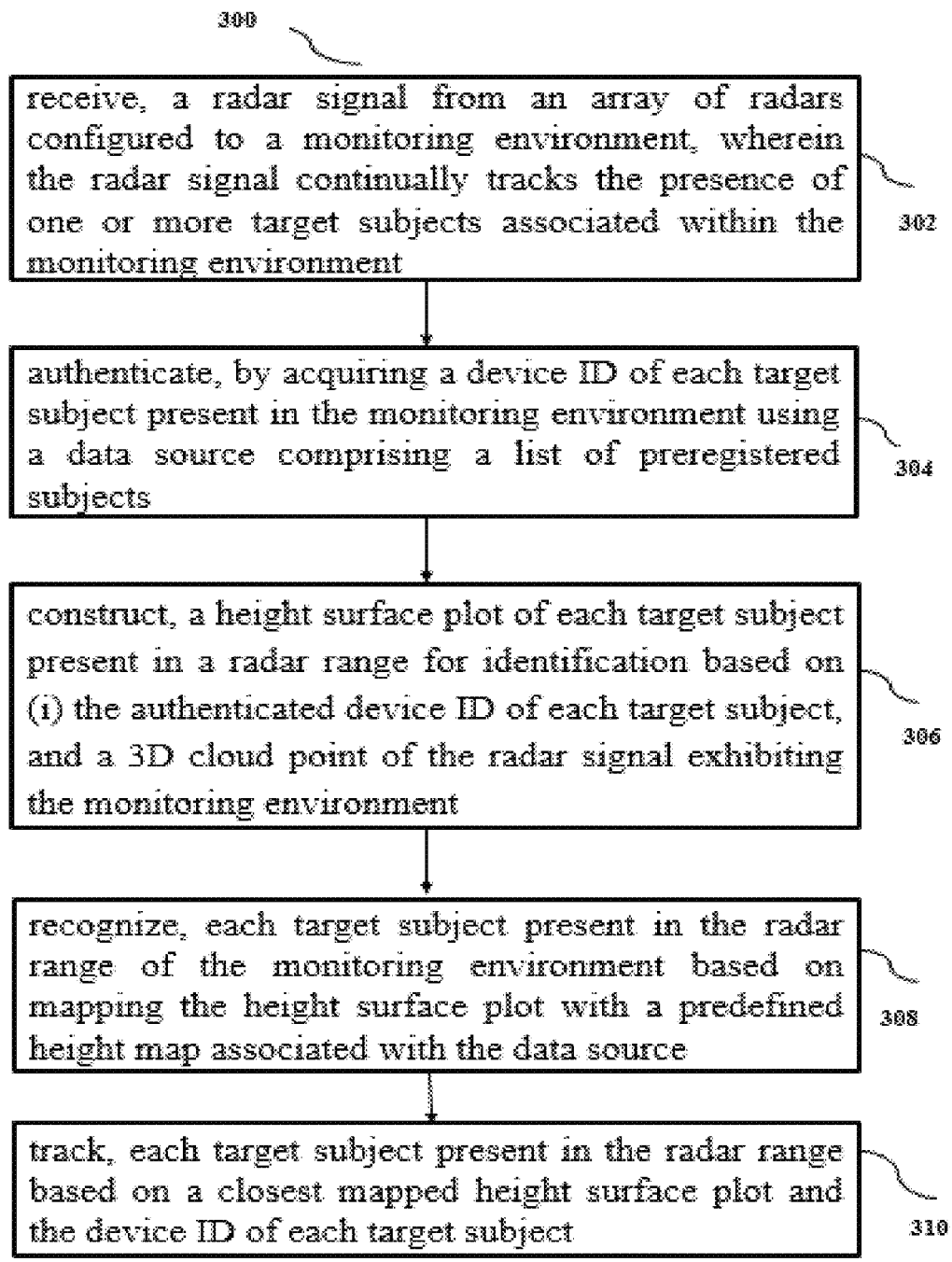
FIG. 2 illustrates a flow diagram to track each target subject moving in the radar range present in the monitoring environment using the system of FIG. 1, in accordance with some embodiments of the present disclosure.

FIG. 2 illustrates a flow diagram to track each target subject moving in the radar range present in the monitoring environment using the system of FIG. 1, in accordance with some embodiments of the present disclosure. In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 300 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Figure 3:
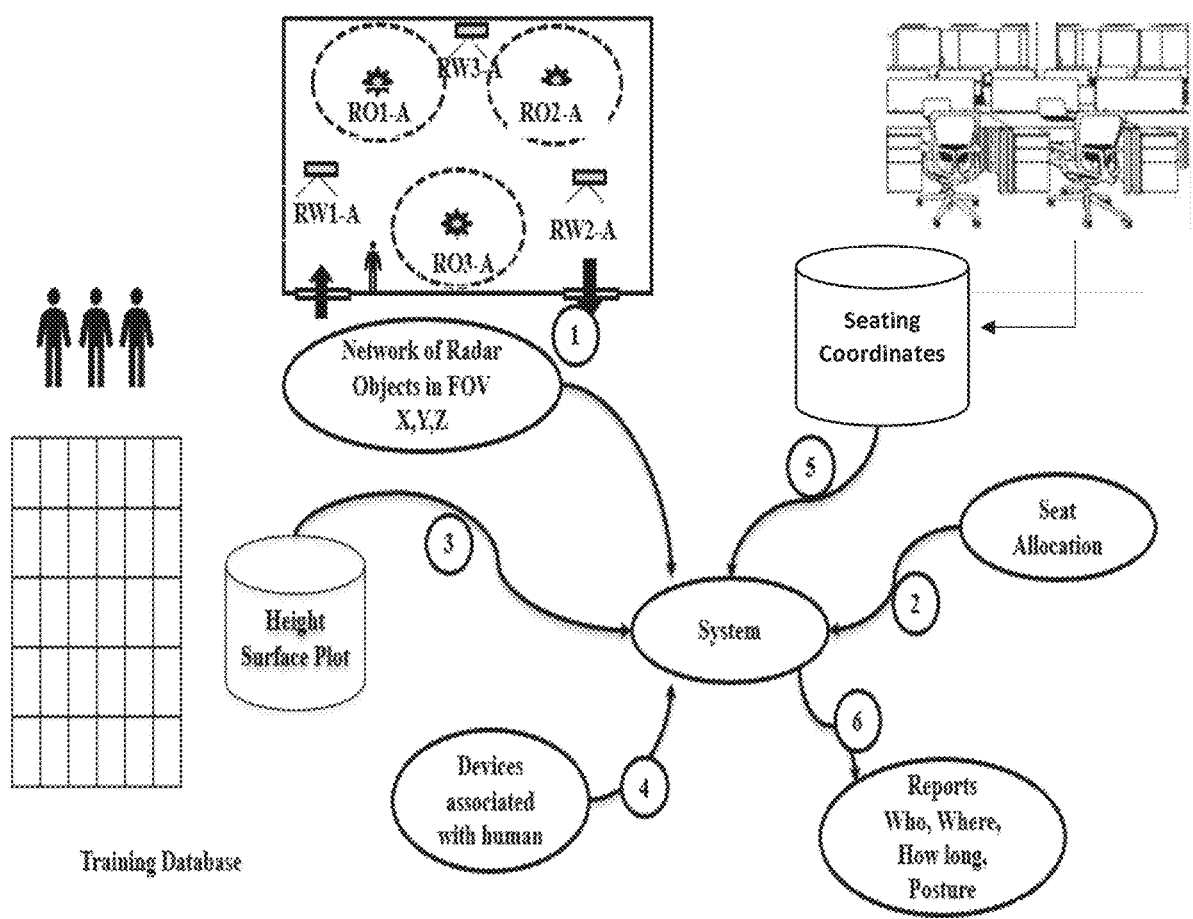
FIG. 3 illustrates a high-level overview of radar signal processing to track and monitor each target subject present in a monitoring environment using the system of FIG. 1, in accordance with some embodiments of the present disclosure.
Figure 4A:
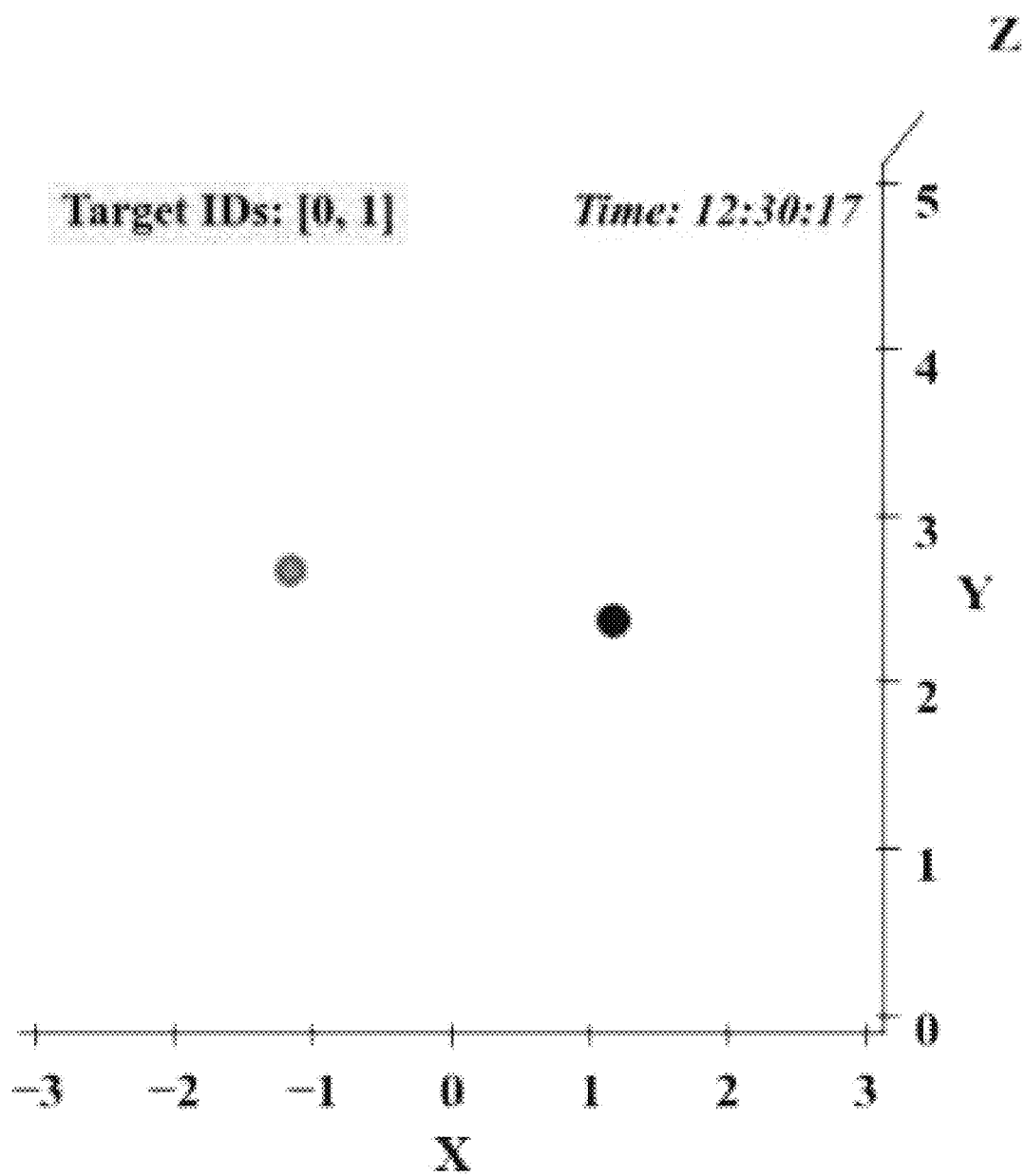
FIG. 4A and FIG. 4B illustrates a 3D point cloud of each target subject present in the radar range being tracked in the monitoring environment using the system of FIG. 1, in accordance with some embodiments of the present disclosure.
Figure 4B:
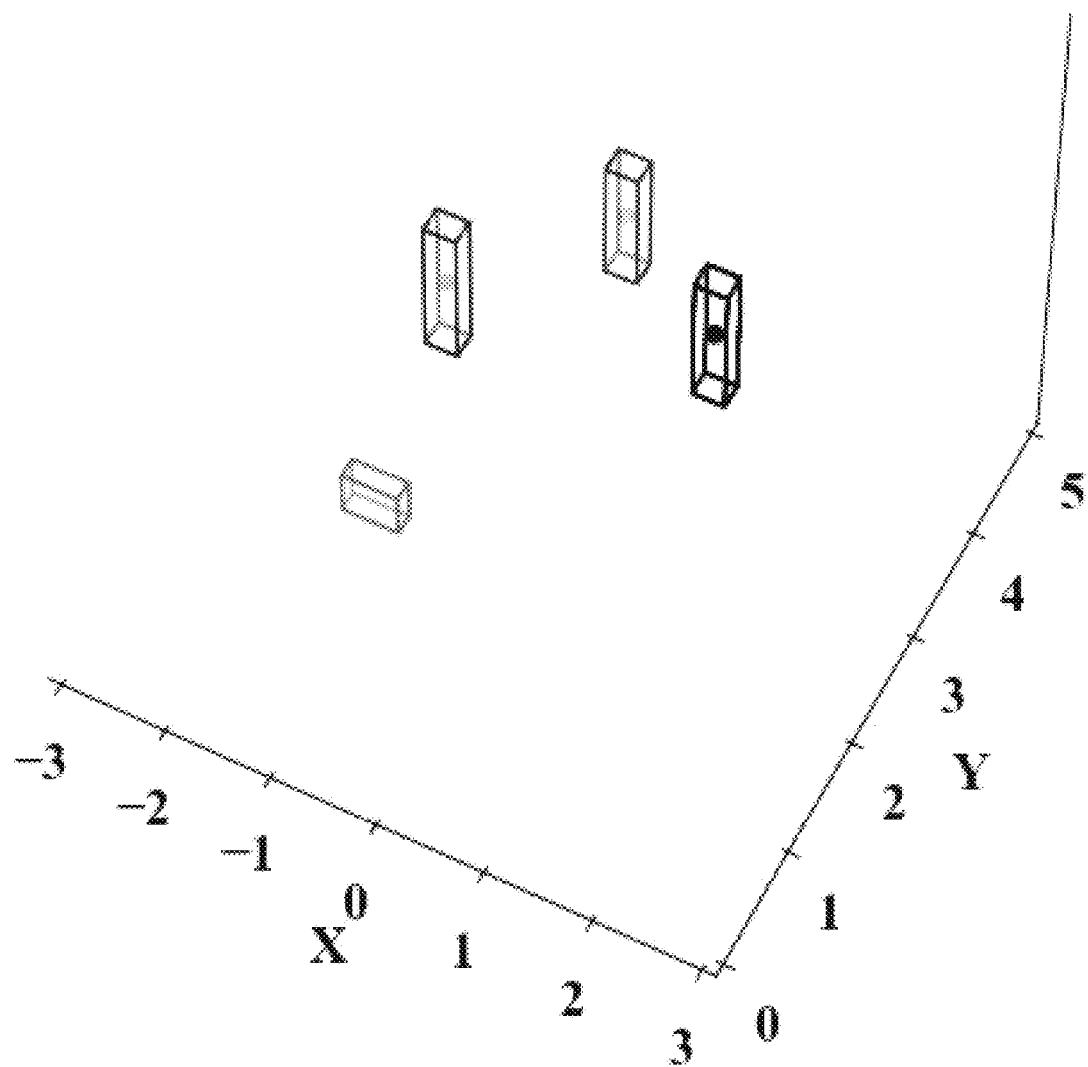

Referring now to the steps of the method 200, at step 202, the one or more hardware processors 104, receive, a radar signal from an array of radars configured to (or in) a monitoring environment, wherein the radar signal continually tracks the presence of one or more target subjects associated within the monitoring environment. In one embodiment, the system enables to track the target subject from the radar signal, and such a system can detect the motion performed by the subject. For example, as shown in the architecture of FIG. 3 the human monitoring system 100 comprises an array of radars configured to the monitoring environment having three axis coordinates to detect and track the target subject. Each radar has certain range to monitor the target subject being moved within the environment. The monitoring environment is configured to track the target subject. Here, the subject in the monitoring environment may include static humans, such as lying human, humans exhibiting low and infrequent motions, such as standing human, and moving humans, such as running or walking human. The subjects (refer FIG. 5A) in the scene of the monitoring environment may also include static objects, such as furniture and periodic movement equipment (not shown). Other objects may also be present in the scene of the monitoring environment. The radar sensor transmits the radar signal capturing the one or more activities performed by the subject in real time, wherein the radar continually scans the environment. The system further processes the radar signal continually tracking the presence of one or more target subjects associated within the monitoring environment. The radar sensor utilized is a frequency modulated continuous wave (FMCW) radar module which is the wall mounted and over mounted module. The FMCW radar has built in ability to differentiate static objects from the moving subject for example (human) in the space of the monitoring environment.

Referring now to the steps of the method 200, at step 204, the one or more hardware processors 104, authenticate each target subject present in the monitoring environment, based on comparing a device ID associated with each target subject with a list of preregistered subjects device IDs. Here, the received radar signal from each radar sensor are processed to authenticate each target subject using the device ID associated the device being carried by each subject in the monitoring environment. As an initial step, the radar sensor transmits up to 30 frames per second data with number of subjects present in the monitoring environment. Here, the system 100 stores the list of preregistered device IDs of subjects being authorized that can move around the environment.

Referring now to the steps of the method 200, at step 206, the one or more hardware processors 104 construct, a height surface plot of each target subject present in a radar range for identification based on (i) the authenticated device ID of each target subject, and a 3D cloud point of the radar signal exhibiting the monitoring environment. Referring now to the above example FIG. 3 and FIG. 5B, which is the initial step and for the radar signal that is obtained from each radar sensor, a 3D point cloud comprising three co-ordinates (x, y, z) is plotted with the surface height of each target subject present within the radar range obtained from the radar signal. The surface height of each target subject is computed using the (z) coordinate. For every frame of the radar signal, several points in the 3D space are sent by the radar system. The co-ordinates (x, y, z) (refer FIG. 4A and FIG. 4B) of these points being received, the height for an individual subject (obtained from the point cloud by computing a highest z-value present in the same), can be plotted in a 3D space for easier visualization. It is observed that the received height profile has linear trend embedded in it, with points closer to the radar having lower z-values than points further away from it. Further, a plurality of grids for the 3D point cloud are formed to obtain a field of view (FOV) of the moving target subject within its present radar range in the monitoring environment. Here, the point cloud is first sorted into the plurality of grids. The entire monitoring environment is broken down into blocks of fixed area. The necessity for this operation arises from the fact that the subject, while moving around in the field of view (FOV) of the radar, that may move over a single point more than once. In such a case, the median of the (z) value is considered for that particular box in the grid. Thus, this step produces a flat grid of points corresponding to their heights in those points for every subject. Grid formation process steps can be described as follows, Entire monitoring environment is broken into the plurality of grids that are of area 25 cm² which is performed in two stage process,
 a. First the entire region is broken into concentric circular region (with radar as the center) with 5 cm width.
 b. Then each Annulus is further divided with equal area patches with each area being 25 cm². (Configurable between 25-50 cm²).
 c. Area of the grid=$\{(R^2-r^2)/2*\varphi\}$ with (R−r)=5-10 cm.

Figure 5A:
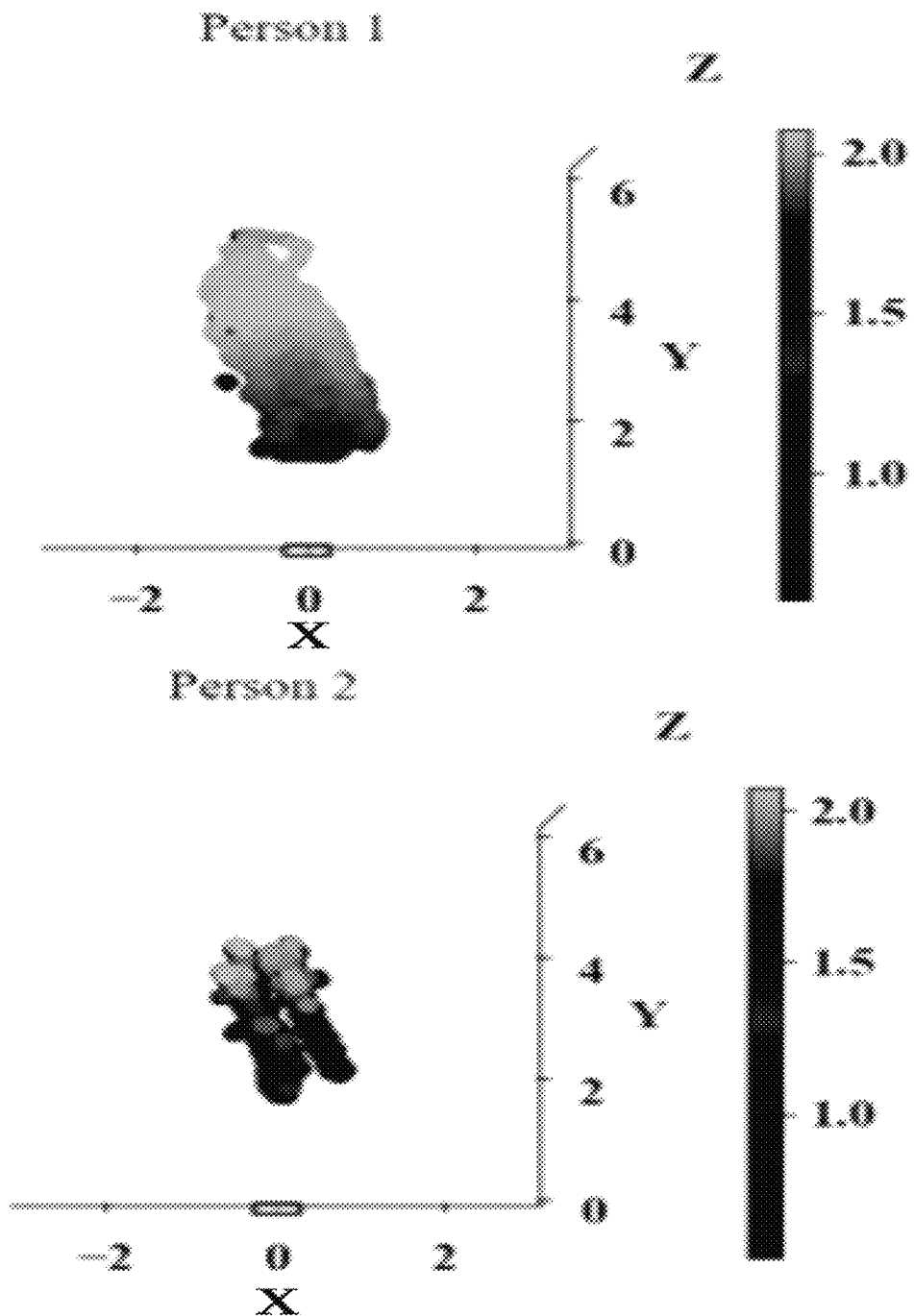
FIG. 5A illustrates an example raw data of each target subject present in the monitoring environment using the system of FIG. 1, in accordance with some embodiments of the present disclosure.
Figure 5B:
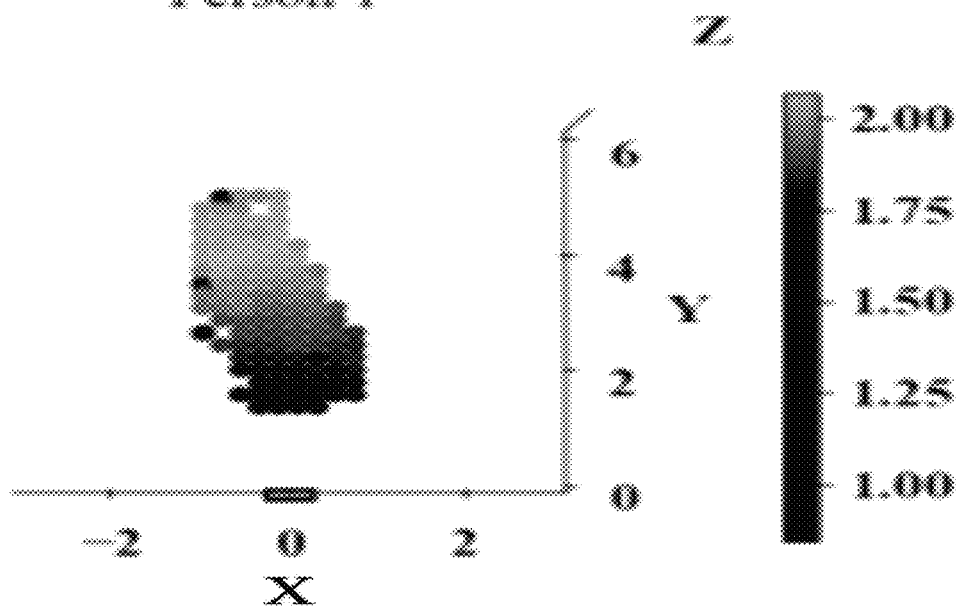
FIG. 5B illustrates the target subject mapping the height surface plot with a predefined height map using the system of FIG. 1, in accordance with some embodiments of the present disclosure.
Figure 5B:
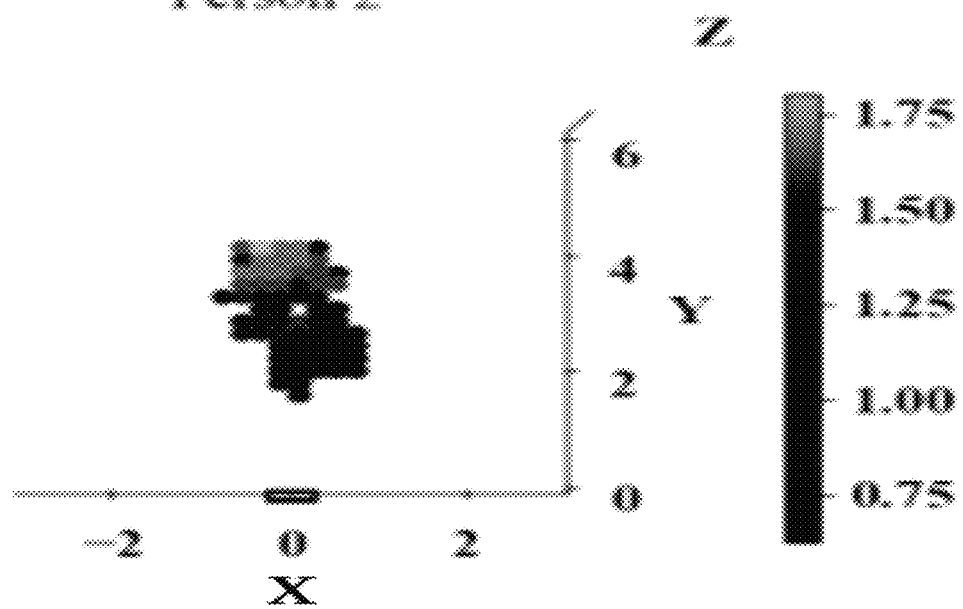
Figure 5C:
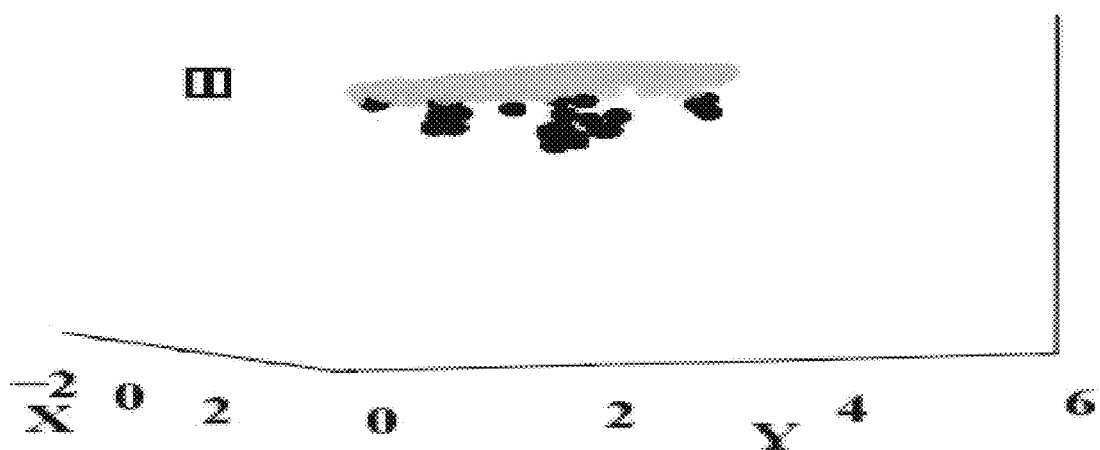
FIG. 5C and FIG. 5D illustrates removal of detected outliers from the 3D point cloud using the system of FIG. 1, in accordance with some embodiments of the present disclosure.
Figure 5C:
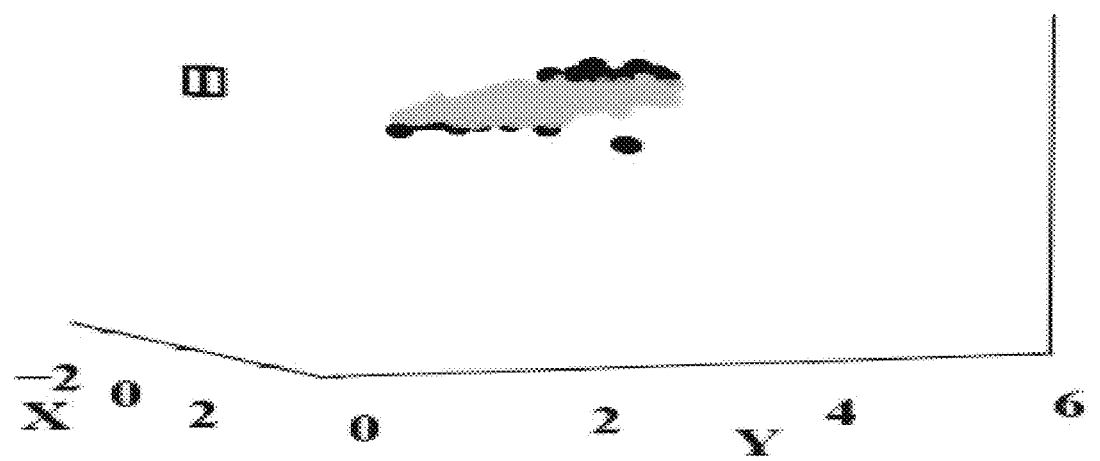
Figure 5D:
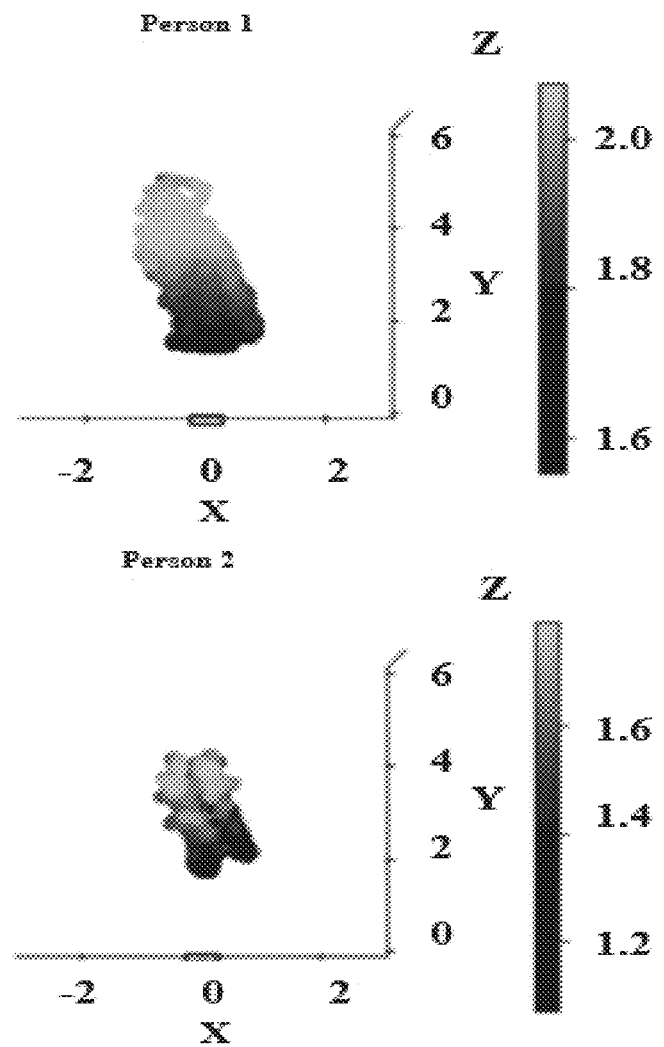

Further, outliers detected from the plurality of grids are removed based on a threshold computed using a mean and a standard deviation, wherein the outliers are detected from each grid using a distance based k nearest neighbor outlier detection technique referring now to (FIG. 5C and FIG. 5D). It is observed that the surface plot obtained after grid formation is noisy and contains several outliers. These outliers are detected and removed in this step. For outlier detection, a distance-based k-nearest neighbors outlier detection method (with k=50) is employed wherein k nearest points from every point in the height map is detected and their average is calculated. All those points with a higher average than a fixed threshold is discarded. The threshold is denoted as below in equation 1, Threshold=mean+(*std* multiplier**std dev*)  equation 1

The mean is denoted as in equation 2, mean=mean (neighbours_dist_avg)  equation 2

The standard deviation is denoted as in equation 3, stddev=*std* (neighbours_dist_avg)  equation 3

Here, the neighbours_dist_avg is an array that stores the average distance of every point from its k nearest neighbors and std stands for standard deviation. The standard deviation multiplier stdMultiplier is taken as 1. All the points whose average distance from its k nearest neighbors is more than thresh, is detected as an outlier. These outliers are subsequently removed from the height map.

Figure 5E:
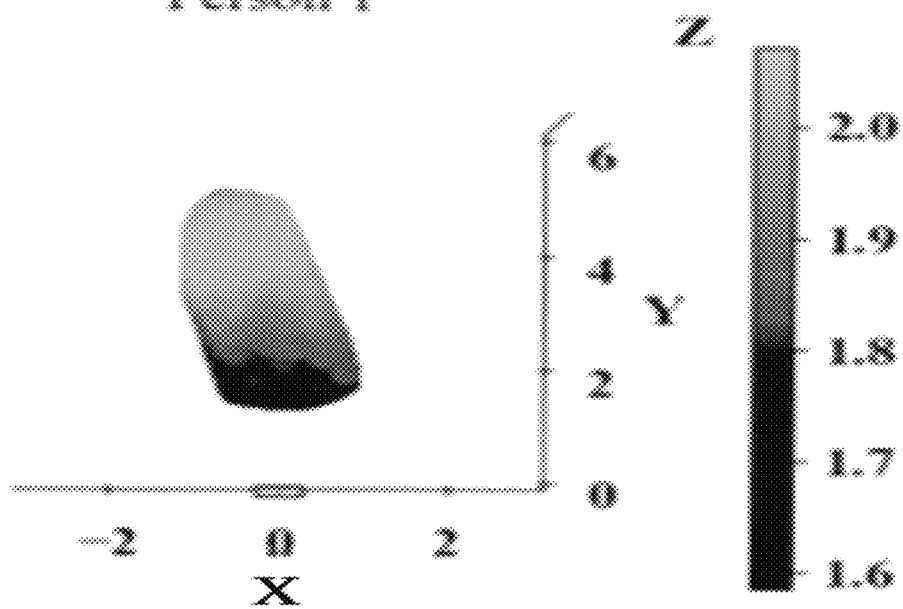
FIG. 5E illustrates interpolation to smoothen the height surface plot using the system of FIG. 1, in accordance with some embodiments of the present disclosure.
Figure 5E:
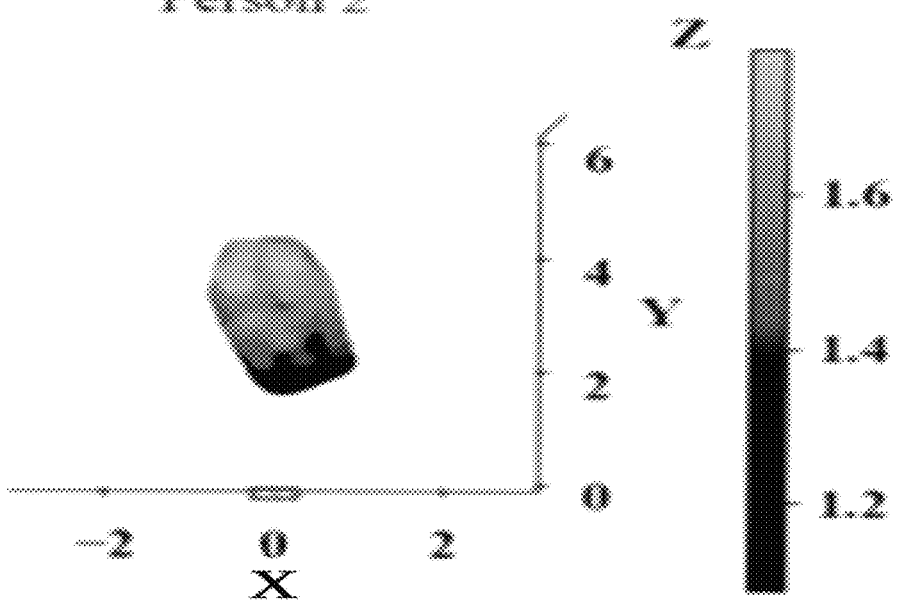
Figure 5F:
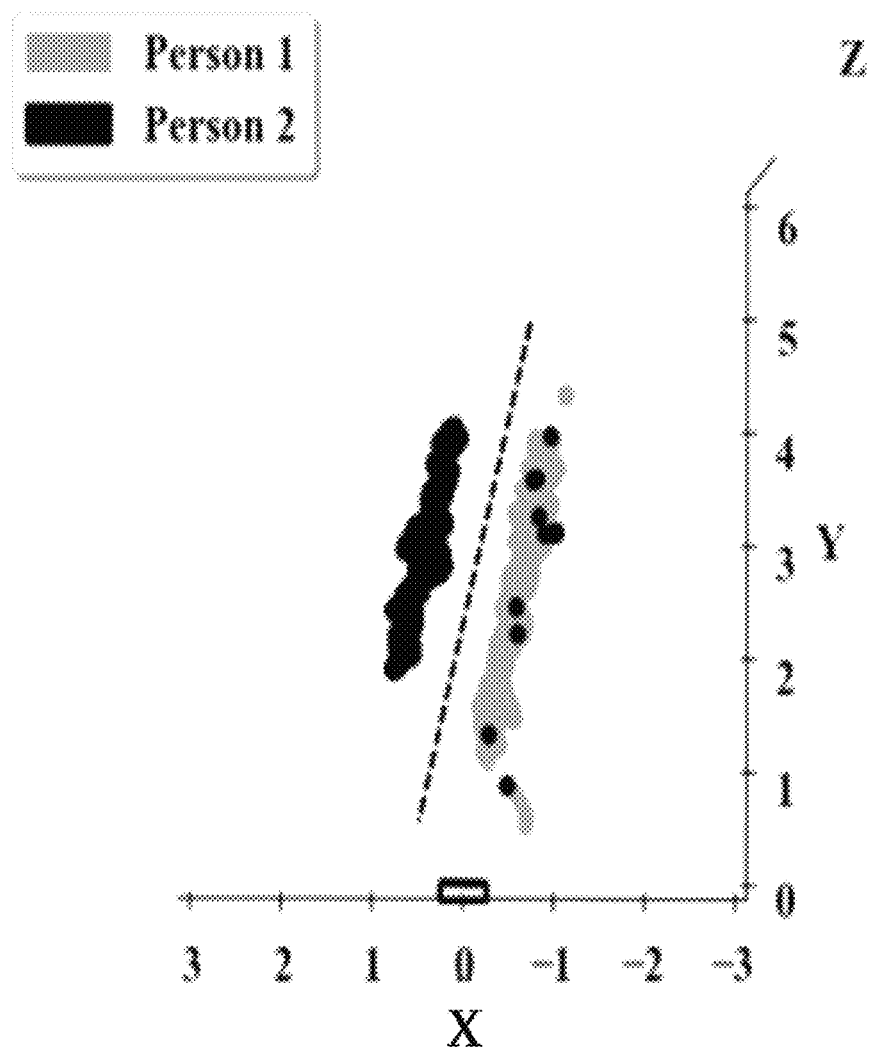
FIG. 5F illustrates the subject being tracked in the monitoring environment using the system of FIG. 1, in accordance with some embodiments of the present disclosure.

Now in FIG. 5E, the method performs interpolation to fill missing spots in the FOV to smoothen height surface plots at a predefined granularity to construct the height surface plot. It is likely that a subject may miss out certain areas in the FOV of the radar while traversing in the same. To compensate for missing points, an interpolation step is carried out. This fills out missing spots in the radar FOV and smoothens the surface plots. In this case, linear 2D interpolation is carried out at a granularity of 5 cm. Such granularity value shall not be construed as limiting the scope of the present disclosure.

Referring now to the steps of the method 200, at step 208, the one or more hardware processors 104 recognize, each target subject present in the radar range of the monitoring environment based on mapping the height surface plot with a predefined height map associated with the data source. Based on the above steps for the FIG. 5F, the 2D Height Map generation is from each person up to a maximum range (distance of the person from the radar) of +/−4 m. This height map is observed to be unique for each individual since it includes the articulated motion of the person (like the gait). It is to be noted that unlike a single height measurement which has statistical measurement error of +/−5 cm at 170 cm height estimation, the height map displays a contour of motion of the person. Here, the height map is a spatial distribution of height points over (x,y) and is compared with the stored height map using standard classifiers.

Referring now to the steps of the method 200, at step 210, the one or more hardware processors 104 track each target subject present in the radar range of the monitoring environment based on a closest mapped height surface plot and the device ID of each target subject. Here, the subjects available in the monitoring environment are segregated to track only target subjects with the interpolated height surface mappings (refer FIG. 5F) have been computed for all individuals, data for the test cases is obtained. These test cases comprise of detected height maps for subjects present in the radar FOV. The test data obtained is initially subjected to a similar outlier removal procedure. Thereafter, the height maps for each subject at a specific (x, y) position is compared against the height maps for all subjects and the closest match is obtained. The closest match directly corresponds to the subject which is finally recognized and identified.

In one embodiment, direct measurement of height and relating such measurement to unique identification of a person (by a wall mounted radar) is erroneous for three primary reasons: One, the height measurement will vary as the person's distance from the radar changes. For all such cases, another reference measurement using the same radar at the identical (x, y) position may be needed. For example, once a person's (x, y, z) coordinates are measured, in order to convert the measured (z) to actual height, the radar beam electronically or mechanically scans and identifies the (z) with respect to the floor/ceiling at exactly the same (x, y) coordinates/position. Subtracting these two gives accurate estimate of height. Secondly, due to the statistical errors embedded in radar measurement which are due to both sensor noise and the environment (such as furniture, wall, their layouts, etc.), a statistical range in height measurement is observed which is +/−5 cm at 170 cm height. Thirdly, number of persons will have the same height range which leads to deep ambiguity in people identification. On the other hand, Height Map is a 2D profile with respect to a person's motion in the observation range. Due to the unique nature of radio wave interaction with a person's gait in a given environment, this 2D map displays unique surface profile (i.e pattern). Therefore, instead of depending on a single measurement, pattern recognition tools (as known in the art recognition tools/techniques) to uniquely identify the person.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of monitoring environment. The embodiment thus provides method and system to track and monitor human using an array of radars. Moreover, the embodiments herein further provide an efficient method to detect and track the subject being present and moved around from one radar range to another radar range within the monitoring environment. The characteristics of each target subject detects the target subject accurately using the array of radars in wall and mounted at ceiling accurately. The method authenticates each target present based on the radar signal from the array of radars, wherein authentication is performed based on comparing a device ID associated with each target subject with a list of preregistered subjects device IDs.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which functions are performed. These examples are presented herein for a purpose of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method to track and monitor target subject using an array of radars, the method comprising:

receiving, via one or more hardware processors, a radar signal from an array of radars configured to a monitoring environment, wherein the radar signal continually tracks the presence of one or more target subjects associated within the monitoring environment authenticating each target subject present in the monitoring environment, via the one or more hardware processors, based on comparing a device ID associated with each target subject with a list of preregistered subject's device IDs;

constructing, via the one or more hardware processors, a height surface plot of each target subject present in a radar range for identification based on (i) the authenticated device ID of each target subject, and a 3D cloud point of the radar signal exhibiting the monitoring environment;

recognizing, via the one or more hardware processors, each target subject present in the radar range of the monitoring environment based on mapping the height surface plot with a predefined height map associated with the data source; and tracking, via the one or more hardware processors, each target subject present in the radar range of the monitoring environment based on a closest mapped height surface plot and the device ID of each target subject.

2. The method as claimed in claim 1, constructing the height surface plot of each target subject present in the radar range by,
- plotting, the 3D point cloud comprising three co-ordinates (X,Y,Z) with the surface height of each target subject present within the radar range obtained from the radar signal, wherein the surface height of each target subject is computed using the Z coordinate;
- forming, a plurality of grids for the 3D point cloud to obtain a field of view (FOV) of the moving target subject within its present radar range in the monitoring environment;
- removing, outliers detected from the plurality of grids based on a threshold computed using a mean and a standard deviation, wherein the outliers are detected from each grid using a distance-based k nearest neighbor outlier detection technique; and
- performing, interpolation to fill missing spots in the FOV to smoothen height surface plots at a predefined granularity to construct the height surface plot.

3. The method as claimed in claim 2, wherein each grid of the 3D point cloud is formed by segmenting the monitoring environment into the plurality of grids having concentric circular area with a pre-defined area and a width, and wherein the plurality of grids are divided into patches.

4. The method as claimed in claim 2, wherein the threshold is the sum of mean and the standard deviation with corresponding neighbors distant average of grids.

5. The method as claimed in claim 1, wherein the height surface plot of each target subject is mapped based on the closest match with the height map having spatial distribution of height points over X and Y coordinates using standard classifiers.

6. The method as claimed in claim 1, wherein the height surface plot represents target subjects' motion observed in the radar range of the monitoring environment.

7. The method as claimed in claim 1, wherein a time spent by each target subject in the radar range of the monitoring environment is computed using the height surface plot and the device ID of corresponding target subject.

8. A system to track and monitor target subject using an array of radars comprises:
- a memory (102) storing instructions;
- one or more communication interfaces (106); and
- one or more hardware processors (104) coupled to the memory (102) via the one or more communication interfaces (106), wherein the one or more hardware processors (104) are configured by the instructions to:
  - receive, a radar signal from an array of radars configured to a monitoring environment, wherein the radar signal continually tracks the presence of one or more target subjects associated within the monitoring environment;
  - authenticate, each target subject present in the monitoring environment, based on comparing a device ID associated with each target subject with a list of preregistered subject's device IDs;
  - construct, a height surface plot of each target subject present in a radar range for identification based on (i) the authenticated device ID of each target subject, and a 3D cloud point of the radar signal exhibiting the monitoring environment;
  - recognize, each target subject present in the radar range of the monitoring environment based on mapping the height surface plot with a predefined height map associated with the data source; and
  - track, each target subject present in the radar range of the monitoring environment based on a closest mapped height surface plot and the device ID of each target subject.

9. The system as claimed in claim 8, constructing the height surface plot of each target subject present in the radar range by,
- plotting, the 3D point cloud comprising three co-ordinates (X,Y,Z) with the surface height of each target subject present within the radar range obtained from the radar signal, wherein the surface height of each target subject is computed using the Z coordinate;
- forming, a plurality of grids for the 3D point cloud to obtain a field of view (FOV) of the moving target subject within its present radar range in the monitoring environment;
- removing, outliers detected from the plurality of grids based on a threshold computed using a mean and a standard deviation, wherein the outliers are detected from each grid using a distance based k nearest neighbor outlier detection technique; and
- performing, interpolation to fill missing spots in the FOV to smoothen height surface plots at a predefined granularity to construct the height surface plot.

10. The system as claimed in claim 9, wherein each grid of the 3D point cloud is formed by segmenting the monitoring environment into the plurality of grids having concentric circular area with a pre-defined area and a width, and wherein the plurality of grids are divided into patches.

11. The system as claimed in claim 9, wherein the threshold is the sum of mean and the standard deviation with corresponding neighbors distant average of grids.

12. The system as claimed in claim 8, wherein the height surface plot of each target subject is mapped based on the closest match with the height map having spatial distribution of height points over X and Y coordinates using standard classifiers.

13. The system as claimed in claim 8, wherein the height surface plot represents target subjects' motion observed in the radar range of the monitoring environment.

14. The system as claimed in claim 8, wherein a time spent by each target subject in the radar range of the monitoring environment is computed using the height surface plot and the device ID of corresponding target subject.

15. One or more non-transitory machine-readable information storage mediums comprising one or more instructions which when executed by one or more hardware processors perform actions comprising:
- receiving, a radar signal from an array of radars configured to a monitoring environment, wherein the radar signal continually tracks the presence of one or more target subjects associated within the monitoring environment
- authenticating, each target subject present in the monitoring environment, based on comparing a device ID associated with each target subject with a list of preregistered subject's device IDs;
- constructing, a height surface plot of each target subject present in a radar range for identification based on (i) the authenticated device ID of each target subject, and a 3D cloud point of the radar signal exhibiting the monitoring environment;
- recognizing, each target subject present in the radar range of the monitoring environment based on mapping the height surface plot with a predefined height map associated with the data source; and tracking, each target subject present in the radar range of the monitoring environment based on a closest mapped height surface plot and the device ID of each target subject.

16. The one or more non-transitory machine-readable information storage mediums of claim method as claimed in claim 15, constructing the height surface plot of each target subject present in the radar range by, plotting, the 3D point cloud comprising three co-ordinates (X,Y,Z) with the surface height of each target subject present within the radar range obtained from the radar signal, wherein the surface height of each target subject is computed using the Z coordinate;

forming, a plurality of grids for the 3D point cloud to obtain a field of view (FOV) of the moving target subject within its present radar range in the monitoring environment;

removing, outliers detected from the plurality of grids based on a threshold computed using a mean and a standard deviation, wherein the outliers are detected from each grid using a distance-based k nearest neighbor outlier detection technique; and performing, interpolation to fill missing spots in the FOV to smoothen height surface plots at a predefined granularity to construct the height surface plot.

17. The one or more non-transitory machine-readable information storage mediums of claim 16, wherein each grid of the 3D point cloud is formed by segmenting the monitoring environment into the plurality of grids having concentric circular area with a pre-defined area and a width, and wherein the plurality of grids are divided into patches.

18. The one or more non-transitory machine-readable information storage mediums of claim 16, wherein the threshold is the sum of mean and the standard deviation with corresponding neighbors distant average of grids.

19. The one or more non-transitory machine-readable information storage mediums of claim 15, wherein the height surface plot of each target subject is mapped based on the closest match with the height map having spatial distribution of height points over X and Y coordinates using standard classifiers.

20. The one or more non-transitory machine-readable information storage mediums of claim 15, wherein a time spent by each target subject in the radar range of the monitoring environment is computed using the height surface plot and the device ID of corresponding target subject.

* * * * *